US011454997B2

(12) United States Patent
Chan et al.

(10) Patent No.: US 11,454,997 B2
(45) Date of Patent: Sep. 27, 2022

(54) DYNAMIC VOLTAGE COMPENSATION CIRCUIT AND METHOD THEREOF

(71) Applicant: REALTEK SEMICONDUCTOR CORP., Hsinchu (TW)

(72) Inventors: Chun-Chieh Chan, Hsinchu (TW); Hsing-Yu Lin, Hsinchu (TW); Yi-Cheng Lin, Pingtung County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 199 days.

(21) Appl. No.: 16/920,461

(22) Filed: Jul. 3, 2020

(65) Prior Publication Data

US 2021/0132641 A1 May 6, 2021

(30) Foreign Application Priority Data

Nov. 1, 2019 (TW) .................................. 108139670

(51) Int. Cl.
*G05F 1/10* (2006.01)
*G05F 1/46* (2006.01)
*G06F 13/40* (2006.01)

(52) U.S. Cl.
CPC ............ *G05F 1/10* (2013.01); *G06F 13/4068* (2013.01)

(58) Field of Classification Search
CPC ........................... G05F 1/10; G05F 1/461–462
See application file for complete search history.

(56) References Cited

U.S. PATENT DOCUMENTS

| 9,727,067 | B2 | 8/2017 | Fujiwara et al. | |
| 9,729,080 | B2* | 8/2017 | Maeda | H02M 7/217 |
| 10,684,634 | B1* | 6/2020 | Yang | G06F 1/28 |
| 2014/0167681 | A1* | 6/2014 | Tu | H02J 7/045 |
| | | | | 320/107 |
| 2015/0035510 | A1* | 2/2015 | Hoshino | H02M 3/157 |
| | | | | 323/283 |

(Continued)

FOREIGN PATENT DOCUMENTS

WO   WO-2016021383 A1 *  2/2016  ............. G01R 15/00

OTHER PUBLICATIONS

English translation of "WO2016021383A",Tokai Rika, Current Sensor (Year: 2016).*

*Primary Examiner* — Sisay G Tiku
(74) *Attorney, Agent, or Firm* — Li & Cai Intellectual Property (USA) Office

(57) ABSTRACT

A dynamic voltage compensation circuit suitable for performing voltage compensation between an electronic device and a multimedia device, and includes a current detection unit, a calculation module and a voltage output unit. The current detection unit is configured to obtain the output current of the electronic device outputting the multimedia device from the bus power terminal. The calculation module is configured to receive the output current and an ideal reference voltage, execute a voltage compensation algorithm to calculate a predetermined output voltage based on the output current, the ideal reference voltage, and a compensation coefficient, and generate a control signal according to the predetermined output voltage. The voltage output unit is configured to receive a control signal, and is controlled by the control signal to generate a compensated output voltage and output it to a bus power terminal.

18 Claims, 4 Drawing Sheets

(56) References Cited

U.S. PATENT DOCUMENTS

2016/0141956 A1* 5/2016 Dong ................... H02M 3/157
 323/271
2016/0173041 A1* 6/2016 Prasad ................ H03F 3/45475
 330/9

* cited by examiner

DYNAMIC VOLTAGE COMPENSATION CIRCUIT AND METHOD THEREOF

CROSS-REFERENCE TO RELATED PATENT APPLICATION

This application claims the benefit of priority to Taiwan Patent Application No. 108139670, filed on Nov. 1, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a dynamic voltage compensation circuit and a method thereof, and more particularly to a dynamic voltage compensation circuit and a method thereof capable of reducing costs.

BACKGROUND OF THE DISCLOSURE

The USB Type-C specification 1.0 was released by the USB Implementers Forum (USB-IF) and was completed in August 2014. It is roughly the same as the USB 3.1 specification. Most USB Type-C devices usually support Power Delivery, which means that as long as the devices communicate through the protocol, voltage and current requirements of the devices can be customized to achieve optimal energy output efficiency. However, this convenience will also raise additional issues, such as in the instance that a basic output specification of USB Type-C is 5V/3 A, which is much higher than the previous USB output specifications, an effect of the high current is that a voltage value actually reaching the device will be lower whenever a resistance on a power output path increases.

Although the current USB Type-C standardizes a cable length, which can be allowed to be up to 4 meters. For a 4 meters 23-AWG copper cable, a line resistance thereof is up to 0.267Ω. Therefore, when a transmission current is 3 A, even without considering the resistance of the path on a printed circuit board, there will still be a voltage loss of 0.801V along the cable. For a 5V output, only 4.2V is left at the device end. Since this voltage drop is much lower than a voltage range (±5%) defined by the specification, it would be impossible for the device to continue to connect.

Although the above-mentioned voltage drop issue can be improved by increasing an area of the copper cable, or using a connector with better conductive material; however, this will lead to an increase in cost and the voltage drop issue will still be at large. In addition, if the compatibility between the connector and the cable is poor, the voltage drop may still be increased. Therefore, there is an urgent need for a dynamic voltage compensation circuit and method capable of reducing cost, achieving flexible voltage compensation, while increasing a reliability of the output voltage.

SUMMARY OF THE DISCLOSURE

In response to the above-referenced technical inadequacies, the present disclosure provides a dynamic voltage compensation circuit and method capable of reducing the cost, and achieving flexible voltage compensation while increasing the reliability of the output voltage.

In one aspect, the present disclosure provides a dynamic voltage compensation circuit suitable for performing voltage compensation between an electronic device and a multimedia device, and includes a current detection unit, a calculation module and a voltage output unit. The current detection unit is configured to obtain an output current output from the electronic device to the multimedia device from a bus power terminal. The calculation module is configured to receive the output current and an ideal reference voltage, execute a voltage compensation algorithm to calculate a predetermined output voltage based on the output current, the ideal reference voltage, and a compensation coefficient, and generate a control signal according to the predetermined output voltage. The voltage output unit is configured to receive a control signal, and is controlled by the control signal to generate a compensated output voltage and output the compensated output voltage to the bus power terminal.

In another aspect, the present disclosure provides a dynamic voltage compensation method suitable for voltage compensation between an electronic device and a multimedia device, and the method includes: configuring a current detection unit to obtain an output current output from the electronic device to the multimedia device from a bus power terminal; configuring a calculation module to receive the output current and an ideal reference voltage, execute a voltage compensation algorithm to calculate a predetermined output voltage based on the output current, the ideal reference voltage, and a compensation coefficient, and generate a control signal according to the predetermined output voltage; and configuring a voltage output unit to receive the control signal, and to be controlled by the control signal to generate the predetermined output voltage and output the predetermined output voltage to the bus power terminal.

Therefore, the dynamic voltage compensation circuit and method provided by the present disclosure can reduce costs, achieve flexible voltage compensation, and increase the reliability of the output voltage.

In addition, the dynamic voltage compensation circuit and method provided by the present disclosure only need a simple circuit structure to make the device compatible with most cables. Furthermore, the voltage compensation mechanism used can be arbitrarily adjusted according to the needs of a user. In addition to a simple linear control method, a non-linear control method can also be achieved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
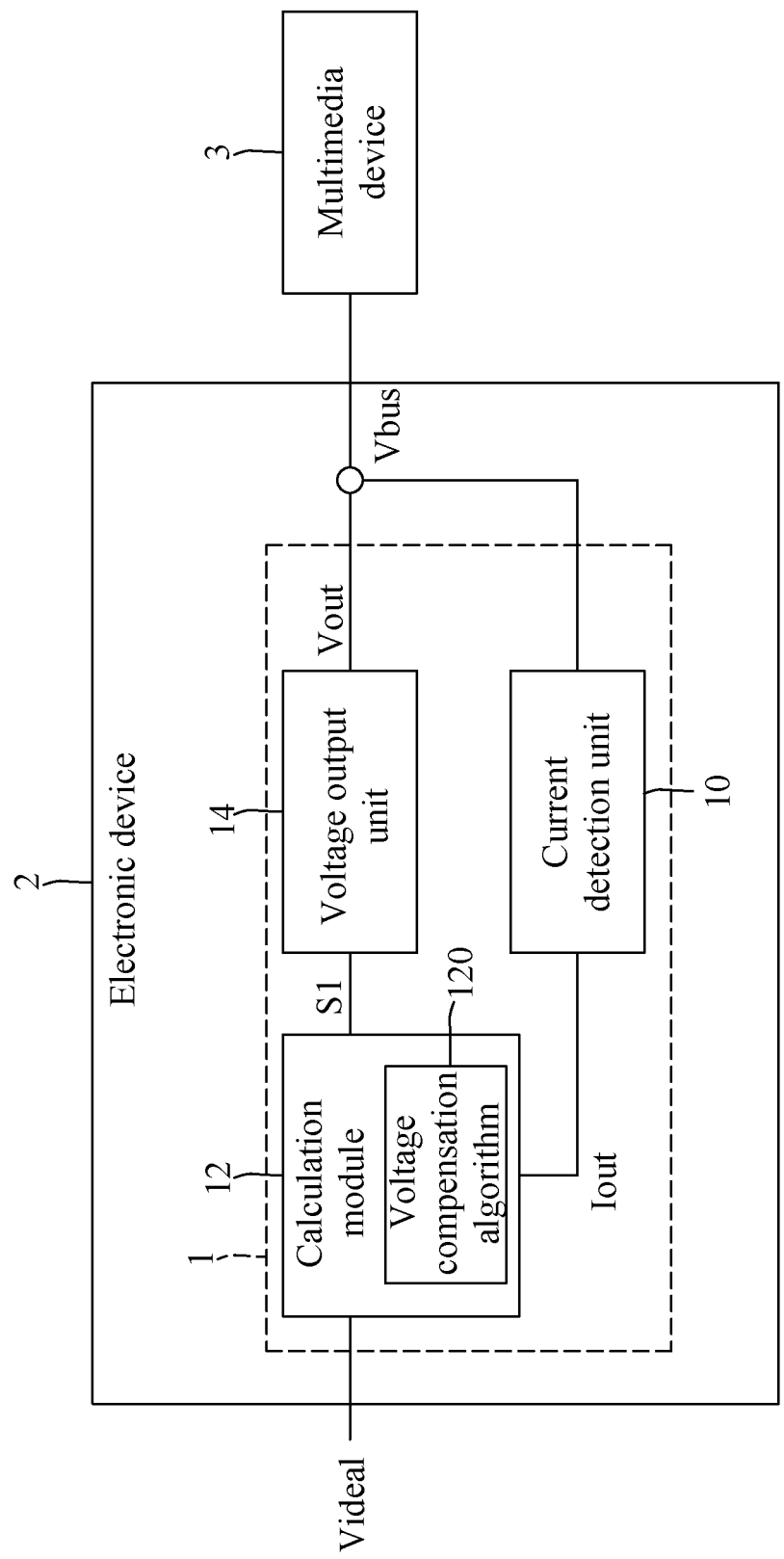
FIG. 1 is a block diagram illustrating a dynamic voltage compensation circuit according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In general, when an electronic device supplies power to another electronic device, there will be losses in a supply path thereof, such as printed circuit board wiring, cables or connectors, or the like, causing an actual voltage received by a power receiving end to be different from expected voltage, or unable to be used most effectively. Therefore, the architecture of the dynamic voltage compensation circuit provided by the present disclosure mainly uses a hardware current feedback device and a software algorithm to perform a dynamic voltage compensation to ensure that the voltage of the power receiving end device is in the most effective range.

FIG. 1 is a block diagram illustrating a dynamic voltage compensation circuit according to an embodiment of the present disclosure. Reference is made to FIG. 1, an embodiment of the present disclosure provides a dynamic voltage compensation circuit 1 suitable for performing the voltage compensation between an electronic device 2 and a multimedia device 3. The dynamic voltage compensation circuit 1 can be part of the electronic device 2 and includes a current detection unit 10, a calculation module 12 and a voltage output unit 14.

The current detection unit 10 is configured to obtain an output current Iout output from the electronic device 2 to the multimedia device 3 from a bus power terminal Vbus, and input the output current Iout to the calculation module 12.

The calculation module 12 is configured to receive the output current Iout and an ideal reference voltage Videal, and execute a voltage compensation algorithm 120.

The voltage compensation algorithm 120 mainly calculates a predetermined output voltage Vout according to the output current Iout, an ideal reference voltage Videal, and a compensation coefficient, and generates a control signal S1 according to the predetermined output voltage Vout. The voltage output unit 14 is configured to receive the control signal S1 and is controlled by the control signal S1 to generate a predetermined output voltage Vout, and output the predetermined output voltage Vout to the bus power terminal Vbus. The voltage output unit 14 can be a current-controlled or voltage-controlled voltage source, and the present disclosure is not limited thereto.

In detail, in a control flow of this circuit, after communicating with the electronic device 2, the multimedia device 3 will firstly obtain a set of ideally required voltage values, that is, an ideal reference voltage Videal. Regarding this communication process, a new communication protocol is defined in the specification of USB Type-C, called Power Delivery (PD). In this communication process, a power supply end is called Source, and a power receiving end is called Sink. The power supply terminal will list all available voltages and currents during an initialization process of the communication process, and after the power receiving end determines electrical information to be used, the power supply terminal can then acknowledge the voltage and current values that should be output. The computing module 12 can obtain the ideal reference voltage Videal, accordingly.

However, since there is a line resistance on a power supply path between the electronic device 2 and the multimedia device 3, the voltage value actually obtained by the multimedia device 3 may not be the same as the ideal reference voltage Videal, and thus the current detection unit 10 will be used as a current feedback device for obtaining a current value of the output current Iout. Finally, this current value is provided to the calculation module 12 to execute a software algorithm. After calculation, the voltage value that should actually be output can be obtained, which is the predetermined output voltage Vout.

Therefore, after summarizing the above control principles, the voltage compensation algorithm can be simplified into the following equation (1) to calculate the predetermined output voltage Vout:

$$Vout = Videal + Iout \times K \qquad \text{Equation (1);}$$

Where Vout is the predetermined output voltage, Videal is the ideal reference voltage, Iout is an output current, and K is a compensation coefficient.

Figure 2:
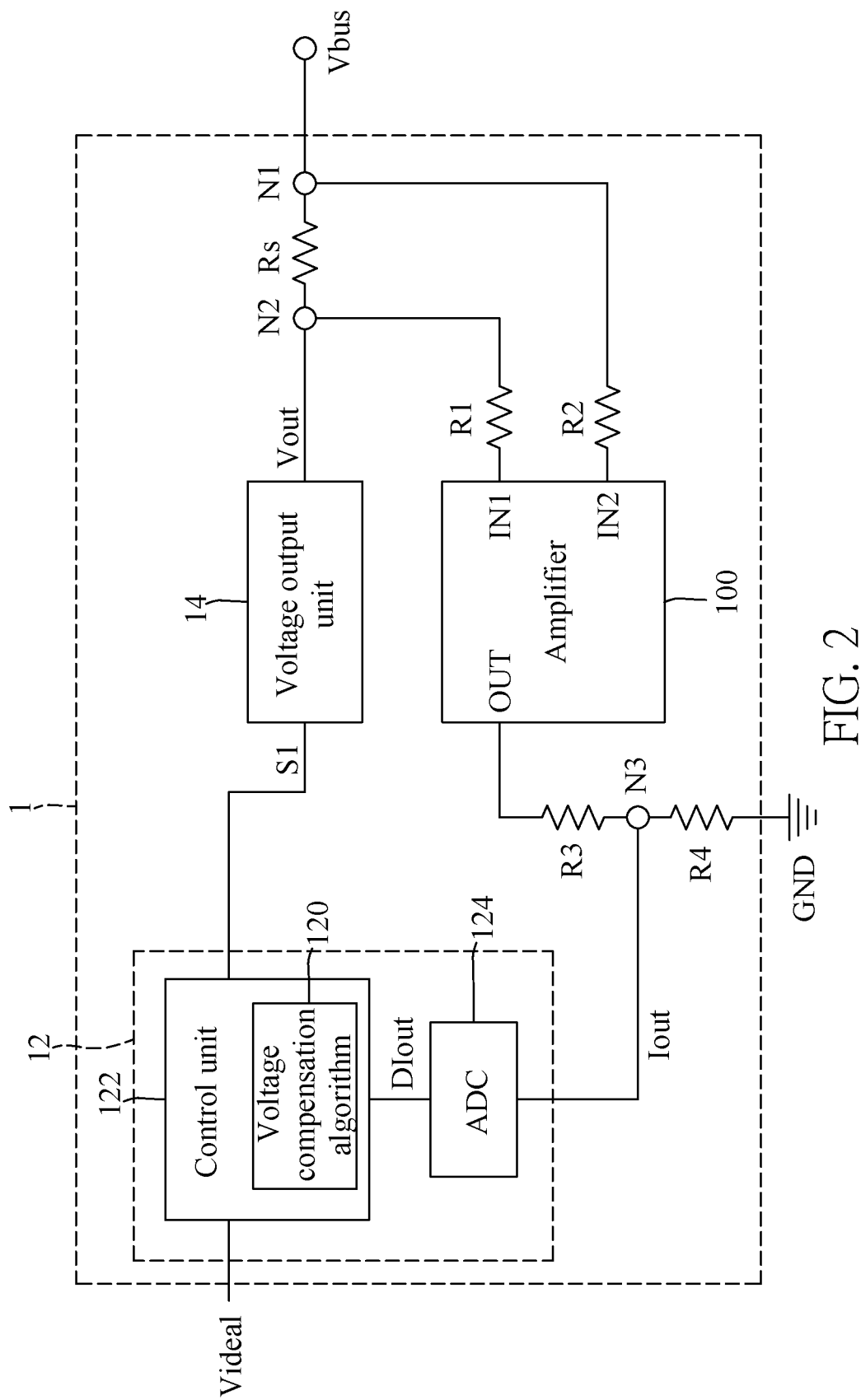
FIG. 2 is a circuit layout of a dynamic voltage compensation circuit according to an embodiment of the present disclosure.

Based on the basic control flow and equation above, an actual circuit will be used to illustrate an example hereinafter. FIG. 2 is a circuit layout of a dynamic voltage compensation circuit according to an embodiment of the present disclosure. As shown in FIG. 2, the voltage output unit 14 is connected to the bus power terminal Vbus through a short-circuit resistor Rs, and the current detection unit 10 includes an amplifier 100. The amplifier has a first input IN1 connected to a first node N1 between the bus power terminal Vbus and the short-circuit resistor Rs through a first resistor R1, a second input IN2 connected to a second node N2 between the short-circuit resistance Rs and the voltage output unit 14 through a second resistor R2, and an output terminal OUT connected a ground terminal GND through a third resistor R3 and a fourth resistor R4.

The amplifier 100 is mainly used to amplify the voltage difference between the voltage of the first node N1 and the voltage of the second node N2, and generate an output current Iout at the third node N3 between the third resistor R3 and the fourth resistor R4 for inputting to the calculation module 12.

In detail, since an output terminal of the dynamic voltage compensation circuit 1 is the bus power terminal Vbus, a short-circuit resistor Rs is used on this path, and an arrangement of the amplifier 100, the first resistor R1, the second resistor R2, the third resistor R3, and the fourth resistor R4 are utilized for estimating the output current Iout from a voltage difference across the short-circuit resistor Rs. It should be noted that the present disclosure is not limited to using the resistor to obtain the output current Iout, any component capable of capturing a current signal may be used. For example, in a possible embodiment of the present disclosure, the current detection unit 10 can include a Hall element for detecting a magnetic flux density from the bus power terminal Vbus, and generating a corresponding output current Iout according to the magnetic flux density.

On the other hand, since a voltage value of terminals of the short-circuit resistance Rs is not connected to the same ground terminals with the calculation module 12, there is also an issue of insufficient resolution. Therefore, the signal value needs to be amplified by the amplifier 100 on the feedback path, and then the signal of this output current Iout is transmitted to the calculation module 12 for calculating the predetermined output voltage Vout. It should be noted that a magnification of the amplifier 100 can be adjusted according to a resolution requirement of the voltage compensation algorithm 120, and thus the magnification is not limited to a specific value.

Next, in the present embodiment, the calculation module 12 includes an analog-to-digital converter (ADC) 124 and a control unit 122. The analog digital converter (ADC) 124 is configured to convert the output current Iout into a digital output current signal DIout, thereby converting an analog voltage to a digital voltage. The control unit 122 is configured to calculate the output current value based on the digital output current signal DIout, execute a voltage compensation algorithm 120 to calculate the predetermined output voltage Vout according to the output current value, the ideal reference voltage Videal and the compensation coefficient K, and generate a control signal S1 according to the predetermined output voltage Vout. It should be noted that the current detection circuit 10 is not limited to providing additional circuits on the PCB, and can also be built on a chip of the electronic device 2 or the multimedia device 3 according to practical requirements.

Figure 3:
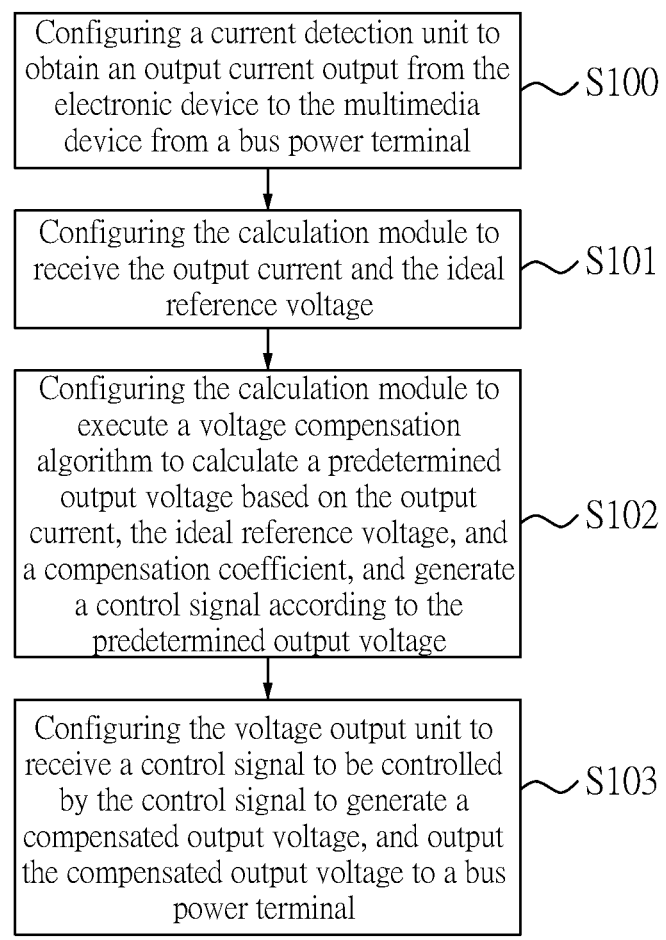
FIG. 3 is a flowchart illustrating a dynamic voltage compensation method according to an embodiment of the present disclosure.

Reference is made to FIG. 3, which is a flowchart illustrating a dynamic voltage compensation method according to an embodiment of the present disclosure. The dynamic voltage compensation method is applicable to the dynamic voltage compensation circuit 1 of the foregoing embodiment, and can be used to perform voltage compensation between the electronic device 2 and the multimedia device 3, but the present disclosure is not limited thereto.

In the present embodiment, the dynamic voltage compensation method includes at least the following steps:

Step S100: configuring a current detection unit to obtain an output current output from the electronic device to the multimedia device from a bus power terminal.

Step S101: configuring the calculation module to receive the output current and the ideal reference voltage.

Step S102: Configuring the calculation module to execute a voltage compensation algorithm to calculate a predetermined output voltage based on the output current, the ideal reference voltage, and a compensation coefficient, and generate a control signal according to the predetermined output voltage.

Step S103: configuring the voltage output unit to receive a control signal to be controlled by the control signal to generate a compensated output voltage, and output the compensated output voltage to a bus power terminal.

Next, after the control unit 120 obtains a small signal voltage value of the output current Iout, it can further perform any arithmetic operations that can be implemented by software or firmware. The method can be arbitrarily adjusted according to the needs of a user. In addition to a simple linear control method, a non-linear control method can also be achieved. In other words, the compensation value K can be changed according to a magnitude of the output current value. In a possible embodiment, the compensation value K may have a linear relationship with the magnitude of the output current value.

Figure 4:
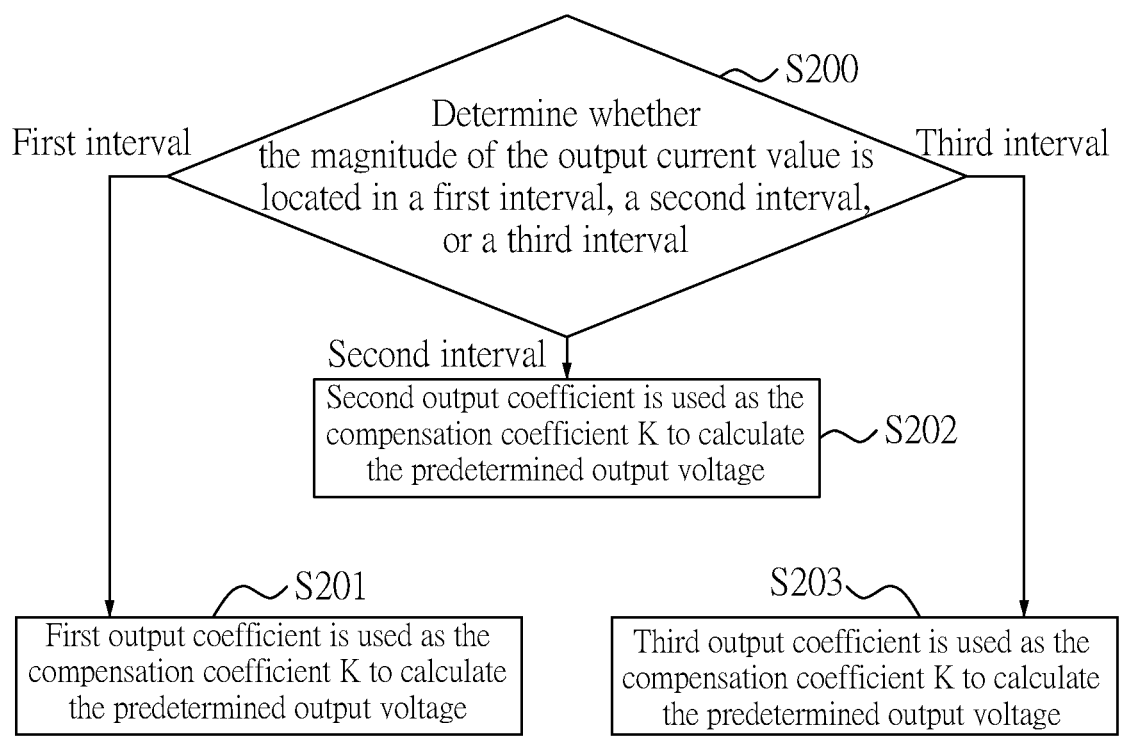
FIG. 4 is another flowchart illustrating a dynamic voltage compensation method according to an embodiment of the present disclosure.

An example of non-linear control is provided hereinafter. Reference is made to FIG. 4, which is another flowchart illustrating a dynamic voltage compensation method according to an embodiment of the present disclosure.

Given that the voltage compensation mechanism performs lower voltage compensation during low current output, and performs more intense voltage compensation as the current output becomes higher, based on the above mechanism, the voltage compensation algorithm 120 can include the following steps:

Step S200: determining whether the magnitude of the output current value is located in a first interval, a second interval, or a third interval.

A first compensation coefficient, a second compensation coefficient, or a third compensation coefficient corresponding to the first interval, the second interval, or the third interval are used, in response to the determined magnitude of the output current value, as the compensation coefficient K, respectively.

In other words, in response to determining that the magnitude of the output current value is located in the first interval, the method proceeds to step S201, in which the first output coefficient is used as the compensation coefficient K to calculate the predetermined output voltage.

In response to determining that the magnitude of the output current value is located in the second interval, the method proceeds to step S202, in which the second output coefficient is used as the compensation coefficient K to calculate the predetermined output voltage.

In response to determining that the magnitude of the output current value is located in the third interval, the method proceeds to step S202, in which the third output coefficient is used as the compensation coefficient K to calculate the predetermined output voltage.

Given that the current in the first interval is less than 1 A, the current in the second interval is between 1 A and 2 A, and the current in the third interval is greater than 2 A, the first compensation coefficient, the second compensation coefficient, and the third compensation coefficient are 0.1V and 0.2V and 0.3V, respectively. A rule thereof is exemplarily set forth as follows:

If $I\text{out} < 1A,$

Then $V\text{out} = V\text{ideal} + I\text{out} \times 0.1$

Else If

1A≤Iout<2A,

Then

Vout=Videal+Iout×0.2

Else If

2A<Iout,

Then

Vout=Videal+Iout×0.3

It can be known from the above rule that the voltage compensation value K is divided into three different intervals by the output current values. That is, when the output current is less than 1 A, the compensation coefficient K is 0.1V. When the current is greater than 1 A and less than 2 A, the compensation coefficient K is 0.2V. When the current is greater than 2 A, the compensation coefficient K is 0.3V. In this way, the output voltage compensation value increases non-linearly as the output current increases.

In conclusion, the dynamic voltage compensation circuit and method provided by the present disclosure can reduce costs, achieve flexible voltage compensation, and increase the reliability of the output voltage.

In addition, the dynamic voltage compensation circuit and method provided by the present disclosure only need a simple circuit structure to make the device compatible with most cables. Furthermore, the voltage compensation mechanism used can be arbitrarily adjusted according to the needs of a user. In addition to a simple linear control method, a non-linear control method can also be achieved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A dynamic voltage compensation circuit suitable for voltage compensation between an electronic device and a multimedia device, comprising:
a current detection unit configured to obtain, from a bus power terminal, an output current output from the electronic device to the multimedia device;
a calculation module configured to receive the output current and an ideal reference voltage, execute a voltage compensation algorithm to calculate a predetermined output voltage based on the output current, the ideal reference voltage, and a compensation coefficient, and generate a control signal according to the predetermined output voltage; and
a voltage output unit configured to receive the control signal, and to be controlled by the control signal to generate the predetermined output voltage and output the predetermined output voltage to the bus power terminal, wherein the calculation module includes:
an analog-to-digital converter (ADC) configured to convert the output current into a digital output current signal; and
a control unit configured to calculate an output current value according to the digital output current signal and execute the voltage compensation algorithm to calculate the predetermined output voltage according to the output current value, the ideal reference voltage and the compensation coefficient, and generate the control signal according to the predetermined output voltage.

2. The dynamic voltage compensation circuit according to claim 1, wherein the ideal reference voltage is generated after the electronic device and the multimedia device perform a communication process.

3. The dynamic voltage compensation circuit according to claim 1, wherein the voltage output unit is connected to the bus power terminal through a short-circuit resistor.

4. The dynamic voltage compensation circuit according to claim 3, wherein the current detection unit includes an amplifier having a first input connected to a first node between the bus power terminal and the short-circuit resistor through a first resistor, a second input terminal connected to a second node between the short-circuit resistance and the voltage output unit through a second resistor, and an output terminal connected to a ground terminal through a third resistor and a fourth resistor, wherein the amplifier is configured to amplify a voltage difference between a voltage of the first node and a voltage of the second node, generate the output current at a third node between the third resistor and the fourth resistor, and input the output current to the calculation module.

5. The dynamic voltage compensation circuit according to claim 1, wherein the current detection unit includes a Hall element configured to detect a magnetic flux density from the bus power terminal, and configured to correspondingly generate the output current according to the magnetic flux density.

6. The dynamic voltage compensation circuit according to claim 1, wherein the voltage compensation algorithm includes calculating the predetermined output voltage by the following equation:

Vout=Videal+Iout×K;

where Vout is the predetermined output voltage, Videal is the ideal reference voltage, Iout is the output current value, and K is the compensation coefficient.

7. The dynamic voltage compensation circuit according to claim 6, wherein the compensation coefficient is changed according to a magnitude of the output current value.

8. The dynamic voltage compensation circuit according to claim 7, wherein the voltage compensation algorithm further includes determining whether the magnitude of the output current value is within a first interval, a second interval, or a third interval, to calculate the predetermined output voltage by using a first compensation coefficient, a second compensation coefficient, or a third compensation coefficient corresponding to the first interval, the second interval, or the third interval as the compensation coefficient, respectively.

9. The dynamic voltage compensation circuit according to claim 7, wherein the compensation value has a linear relationship with the magnitude of the output current value.

10. A dynamic voltage compensation method suitable for voltage compensation between an electronic device and a multimedia device, the method comprising:

configuring a current detection unit to obtain, from a bus power terminal, an output current output from the electronic device to the multimedia device;

configuring a calculation module to receive the output current and an ideal reference voltage, execute a voltage compensation algorithm to calculate a predetermined output voltage based on the output current, the ideal reference voltage, and a compensation coefficient, and generate a control signal according to the predetermined output voltage;

configuring an analog-to-digital converter (ADC) to convert the output current into a digital output current signal;

configuring a control unit to calculate an output current value according to the digital output current signal and execute the voltage compensation algorithm to calculate the predetermined output voltage according to the output current value, the ideal reference voltage and the compensation coefficient, and generate the control signal according to the predetermined output voltage; and configuring a voltage output unit to receive the control signal, and to be controlled by the control signal to generate the predetermined output voltage and output the predetermined output voltage to the bus power terminal.

11. The dynamic voltage compensation method according to claim 10, wherein the ideal reference voltage is generated after the electronic device and the multimedia device perform a communication process.

12. The dynamic voltage compensation method according to claim 10, wherein the voltage output unit is connected to the bus power terminal through a short-circuit resistor.

13. The dynamic voltage compensation method according to claim 12, wherein the current detection unit includes an amplifier having a first input connected to a first node between the bus power terminal and the short-circuit resistor through a first resistor, a second input terminal connected to a second node between the short-circuit resistance and the voltage output unit through a second resistor, and an output terminal connected to a ground terminal through a third resistor and a fourth resistor, and the dynamic voltage compensation method further comprises:

configuring the amplifier to amplify a voltage difference between a voltage of the first node and a voltage of the second node, generate the output current at a third node between the third resistor and the fourth resistor, and input the output current to the calculation module.

14. The dynamic voltage compensation method according to claim 10, wherein the current detection unit includes a Hall element, and the dynamic voltage compensation method further comprising configuring the Hall element to detect a magnetic flux density from the bus power terminal, and configured to correspondingly generate the output current according to the magnetic flux density.

15. The dynamic voltage compensation method according to claim 10, wherein the voltage compensation algorithm includes calculating the predetermined output voltage by the following equation:

$$Vout = Videal + Iout \times K;$$

where Vout is the predetermined output voltage, Videal is the ideal reference voltage, Iout is the output current value, and K is the compensation coefficient.

16. The dynamic voltage compensation method according to claim 15, wherein the compensation coefficient is changed according to a magnitude of the output current value.

17. The dynamic voltage compensation method according to claim 16, wherein the voltage compensation algorithm further includes determining whether the magnitude of the output current value is within a first interval, a second interval, or a third interval, to calculate the predetermined output voltage by using a first compensation coefficient, a second compensation coefficient, or a third compensation coefficient corresponding to the first interval, the second interval, or the third interval as the compensation coefficient, respectively.

18. The dynamic voltage compensation method according to claim 16, wherein the compensation value has a linear relationship with the magnitude of the output current value.

* * * * *